US012757875B2

(12) United States Patent
Zhou et al.

(10) Patent No.: US 12,757,875 B2
(45) Date of Patent: Oct. 13, 2026

(54) ANIMAL BODY-TEMPERATURE CAPTURING APPARATUS AND ANIMAL INFORMATION COLLECTING SYSTEM

(71) Applicant: Beijing Etag Technology Company., Ltd., Beijing (CN)

(72) Inventors: Xingfu Zhou, Beijing (CN); Jiping Ren, Beijing (CN); Chao Pang, Beijing (CN); Dongge Hu, Beijing (CN); Jiemin Dong, Beijing (CN); Shijie Ding, Beijing (CN); Jingkuo Li, Beijing (CN); Jingyi Zhou, Beijing (CN)

(73) Assignee: Beijing Etag Technology Company., Ltd., Beijing (CN)

( * ) Notice: Subject to any disclaimer, the term of this patent is extended or adjusted under 35 U.S.C. 154(b) by 0 days.

(21) Appl. No.: 19/215,320

(22) Filed: May 22, 2025

(65) Prior Publication Data

US 2026/0157347 A1 Jun. 11, 2026

(30) Foreign Application Priority Data

Dec. 9, 2024 (CN) ......................... 202411803203.4

(51) Int. Cl.
*A01K 29/00* (2006.01)
*A01K 11/00* (2006.01)

(52) U.S. Cl.
CPC .......... *A01K 29/005* (2013.01); *A01K 11/001* (2013.01)

(58) Field of Classification Search
CPC ................ A01K 29/005; A01K 1/0317; A01K 15/0275; A01K 29/002; A01K 29/004;
(Continued)

(56) References Cited

U.S. PATENT DOCUMENTS 4,597,208 A * 7/1986 Chevillot ............. A01K 11/001 40/301
6,021,592 A * 2/2000 Caisley ................ A01K 11/001 40/668
(Continued)

FOREIGN PATENT DOCUMENTS

CN 107836369 B 8/2021
CN 113575455 A 11/2021
(Continued)

OTHER PUBLICATIONS

The European search report of Counterpart European Patent Application No. 25176504.6 issued on Oct. 16, 2025.
(Continued)

*Primary Examiner* — William L Gmoser

(57) ABSTRACT

Provided is an animal body-temperature capturing apparatus and an animal information collecting system, where the animal body-temperature capturing apparatus includes a male buckle and a female buckle detachably connected to each other, where the male buckle is capable of penetrating through an organ of an animal, and the female buckle and the male buckle are fitted for clamping the organ of the animal; a body-temperature conductive portion is provided on a side of the male buckle facing the female buckle, the male buckle is provided therein with a sensing module configured to sense a temperature of the body-temperature conductive portion; and the male buckle is further provided therein with a processing module, where the processing module is electrically connected to the sensing module, and the processing module is configured to acquire a temperature signal of the sensing module, and transmit identity information and the temperature signal to a terminal device.

15 Claims, 5 Drawing Sheets

(58) Field of Classification Search
CPC .... A01K 29/007; A01K 29/00; A01K 11/001; A01K 11/004; A61D 17/00–008
See application file for complete search history.

(56) References Cited

U.S. PATENT DOCUMENTS

| | | | | | |
|---|---|---|---|---|---|
| 6,098,324 | A * | 8/2000 | Nepote | A01K 11/004 40/302 |
| 9,848,577 | B1 * | 12/2017 | Brandao | A01K 11/004 |
| 10,779,510 | B1 * | 9/2020 | Moss | A61B 5/6815 |
| 11,793,164 | B1 * | 10/2023 | Huang | A01K 11/004 |
| 12,114,640 | B2 * | 10/2024 | Antoine | A01K 11/004 |
| 2018/0027765 | A1 * | 2/2018 | Butler | A01K 11/004 |
| 2018/0325382 | A1 * | 11/2018 | Brandao | A01K 15/023 |
| 2020/0383298 | A1 * | 12/2020 | Yang | A01K 11/004 |
| 2022/0007614 | A1 | 1/2022 | Jung | |
| 2025/0180412 | A1 * | 6/2025 | Lee | A01K 11/001 |

FOREIGN PATENT DOCUMENTS

| | | |
|---|---|---|
| CN | 111972307 B | 3/2022 |
| CN | 114916460 A | 8/2022 |

OTHER PUBLICATIONS

Communication pursuant to Article 94(3) EPC of Counterpart European Patent Application No. 25176504.6 issued on Oct. 28, 2025.

* cited by examiner

ANIMAL BODY-TEMPERATURE CAPTURING APPARATUS AND ANIMAL INFORMATION COLLECTING SYSTEM

CROSS REFERENCE TO RELATED APPLICATIONS

The present disclosure claims the benefit of Chinese Patent Application No. 2024118032034, filed on Dec. 9, 2024, which is incorporated herein by reference in its entirety.

TECHNICAL FIELD

The present disclosure relates to the technical field of animal body-temperature capturing apparatuses, and specifically to an animal body-temperature capturing apparatus and an animal information collecting system.

BACKGROUND ART

Electronic tags applied to animals are primarily used for tracking, identification and management in the industry of animal husbandry, such as pigs, cattle, sheep and other livestock. Animal electronic tags can record and track animals using means of electronic information. However, existing animal electronic tags generally only have a function of tracking animals, and although they can conduct unique identification and disease tracing of individual animals, they fail to monitor the animal body temperature.

SUMMARY

A technical problem to be solved by the present disclosure is to provide an animal body-temperature capturing apparatus and an animal information collecting system, which can monitor a status of animal body temperature, and can transmit abnormal conditions of animals such as a phenomenon of abnormal body temperature to a terminal device, allowing staff to timely find and handle the same, thereby avoiding unnecessary losses.

In order to solve the above technical problem, the present disclosure adopts technical solutions as follows.

In the first aspect, the present disclosure provides an animal body-temperature capturing apparatus, including a male buckle and a female buckle detachably connected to each other, where the male buckle is capable of penetrating through an organ of an animal, and the female buckle and the male buckle are fitted for clamping the organ of the animal; a body-temperature conductive portion is provided on a side of the male buckle facing the female buckle, the male buckle is provided therein with a sensing module configured to sense a temperature of the body-temperature conductive portion; and the male buckle is further provided therein with a processing module, where the processing module is electrically connected to the sensing module, and the processing module is configured to acquire a temperature signal of the sensing module, and transmit identity information and the temperature signal to a terminal device.

As an embodiment, the male buckle is further provided therein with a receiving coil, where the receiving coil is electrically connected to the sensing module and the processing module, and the receiving coil is capable of generating induced current, and provides a power supply for the sensing module and the processing module.

As an embodiment, the male buckle is further provided therein with an antenna, and the antenna is connected to the processing module for receiving or sending signals.

As an embodiment, the male buckle is provided therein with a support portion, and the receiving coil, the processing module and the sensing module are all fixed on the support portion.

As an embodiment, the male buckle includes a piercing main body, where the piercing main body includes a piercing portion, and the female buckle is capable of being sleeved on an outer surface of the piercing portion.

As an embodiment, the piercing portion includes a piercing rod; and the piercing main body further includes a base portion, where the base portion is connected to the piercing rod, and a radial dimension of the piercing rod gradually increases from a connection position with the base portion in a direction extending away from the base portion.

As an embodiment, the piercing portion further includes a piercing tip for limiting the female buckle, where the piercing tip is connected to the piercing rod, and an end of the piercing tip connected to the piercing rod has a radial diameter greater than that of the piercing rod.

As an embodiment, the male buckle further includes a protective sleeve, where the protective sleeve is sleeved on an outer surface of the base portion, and the support portion is located in the protective sleeve.

As an embodiment, the base portion includes a first base layer and a second base layer, where a radial dimension of the second base layer is greater than that of the first base layer, and the body-temperature conductive portion is provided on the first base layer; and the protective sleeve is provided with a through-hole, and the first base layer is adapted to the through-hole.

In the second aspect, the present disclosure further provides an animal information collecting system, including the animal body-temperature capturing apparatus provided in the first aspect, and further including a feeding apparatus, where the feeding apparatus is provided with the terminal device, where the terminal device is capable of generating a varying magnetic field for enabling the male buckle to generate induced current.

The technical solutions of the present disclosure have the following beneficial effects.

Through the male buckle and the female buckle detachably connected to each other, when the male buckle penetrates through the organ of the animal, the female buckle can be connected to the male buckle. Moreover, the body-temperature conductive portion is provided on a side of the male buckle facing the female buckle, the male buckle is further provided therein with the sensing module configured to sense the temperature of the body-temperature conductive portion, where when the male buckle and the female buckle clamp the organ of the animal, the body-temperature conductive portion can sense a temperature of the organ of the animal and transmit the temperature to the sensing module, the processing module in the male buckle electrically connected to the sensing module can acquire the temperature signal of the sensing module, and transmit the identity information and temperature signal of corresponding animal to the terminal device, thus realizing detection of the body temperature of the animal, and when an abnormal body temperature is detected in an animal, specific animal information can be retrieved through the terminal device, thus accurately identifying and locating the animal with abnormal body temperature.

BRIEF DESCRIPTION OF DRAWINGS

In order to more clearly illustrate technical solutions of some embodiments of the present disclosure, drawings that need to be used in some embodiments of the present disclosure will be briefly introduced below. It should be understood that the drawings only show some embodiments of the present disclosure, and thus should not be regarded as limitation to the scope. Those ordinary skilled in the art could also obtain other relevant drawings based on these drawings without using any inventive efforts.

Reference signs: 1-male buckle; 11-piercing main body; 111-piercing portion; 1111-piercing rod; 1112-piercing tip; 112-base portion; 1121-first base layer; 1122-second base layer; 2-female buckle; 3-body-temperature conductive portion; 4-processing module; 5-sensing module; 6-receiving coil; 7-antenna; 8-support portion; 9-protective sleeve; 10-feeding apparatus.

DETAILED DESCRIPTION OF EMBODIMENTS

Technical solutions in some embodiments of the present disclosure will be described below with reference to drawings in some embodiments of the present disclosure.

It should be noted that like reference signs and letters represent like items in the following drawings, and thus, once a certain item is defined in one drawing, it is unnecessary to further define and explain the same in subsequent drawings. Moreover, in the description of the present disclosure, the terms such as “first” and “second” are merely used for distinguishing the description, but should not be construed as indicating or implying importance in the relativity.

Figure 1:
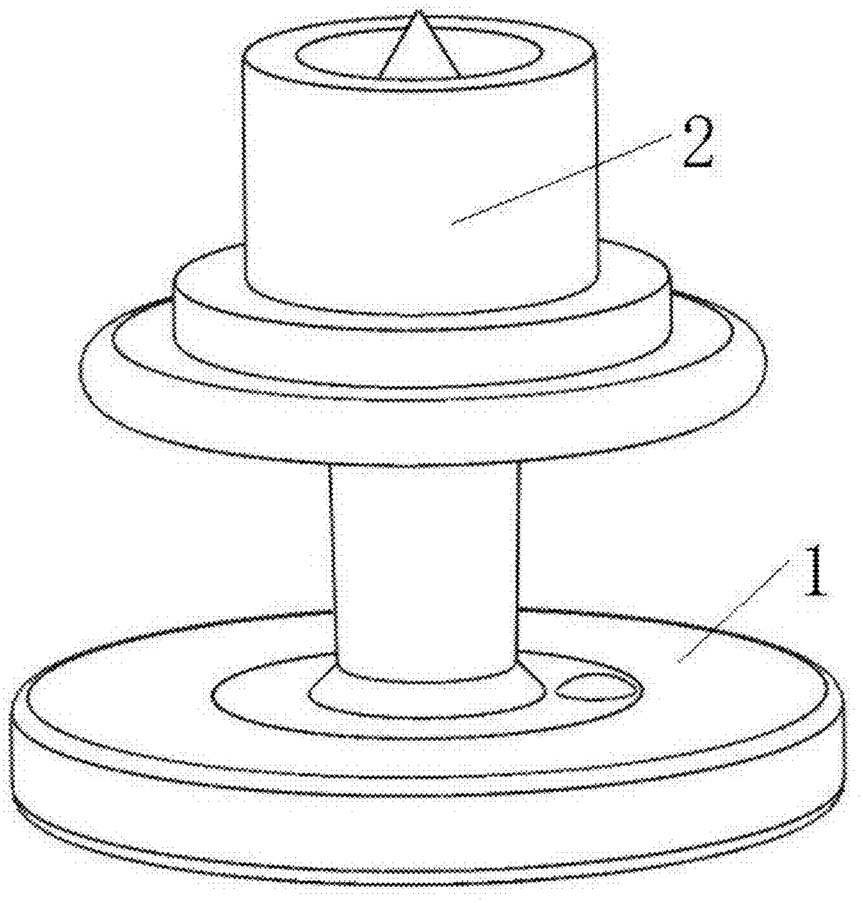
FIG. 1 is a structural schematic view of an animal body-temperature capturing apparatus provided by embodiments of the present disclosure.
Figure 2:
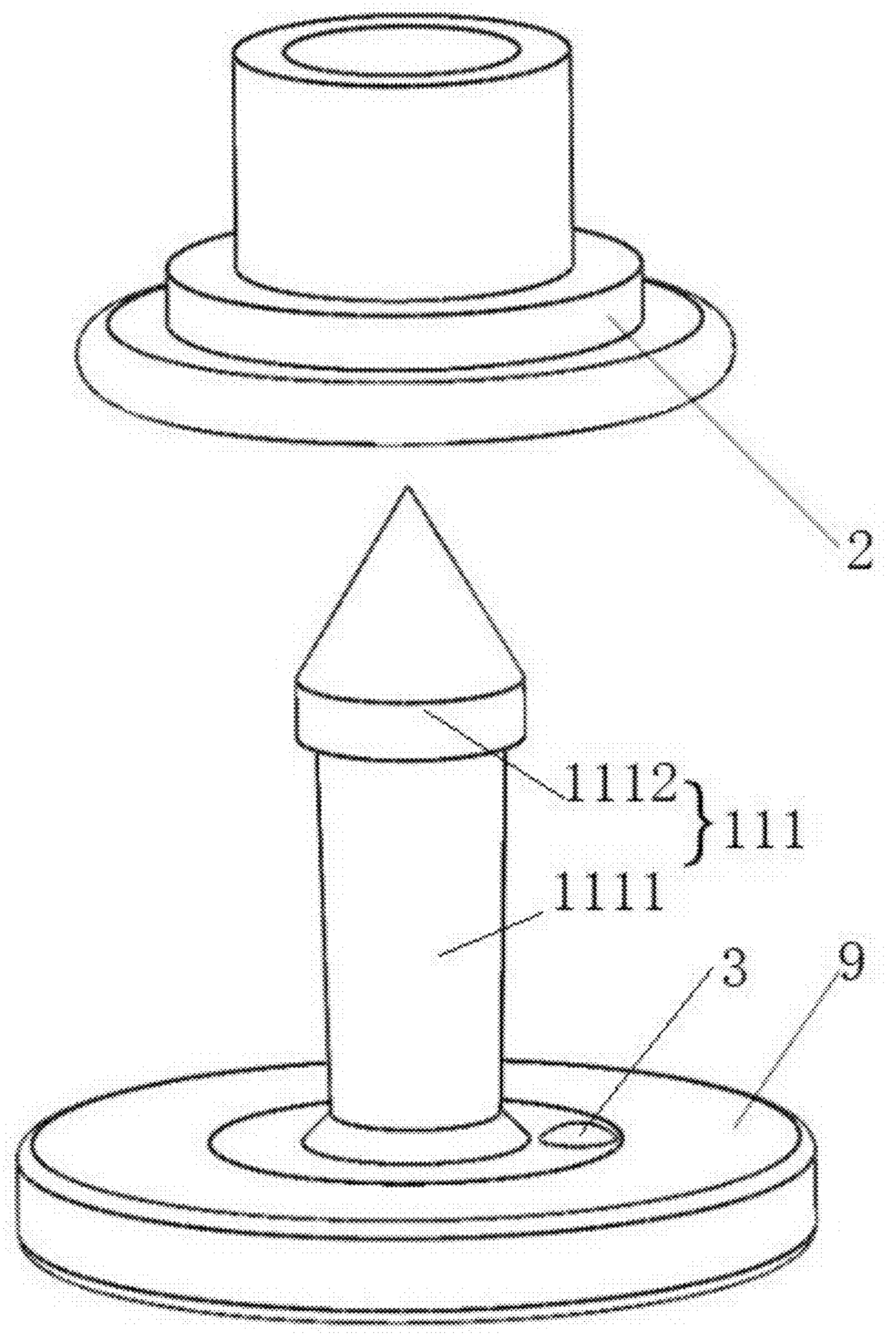
FIG. 2 is a structural schematic view of the animal body-temperature capturing apparatus provided by embodiments of the present disclosure in different viewing angles.
Figure 3:
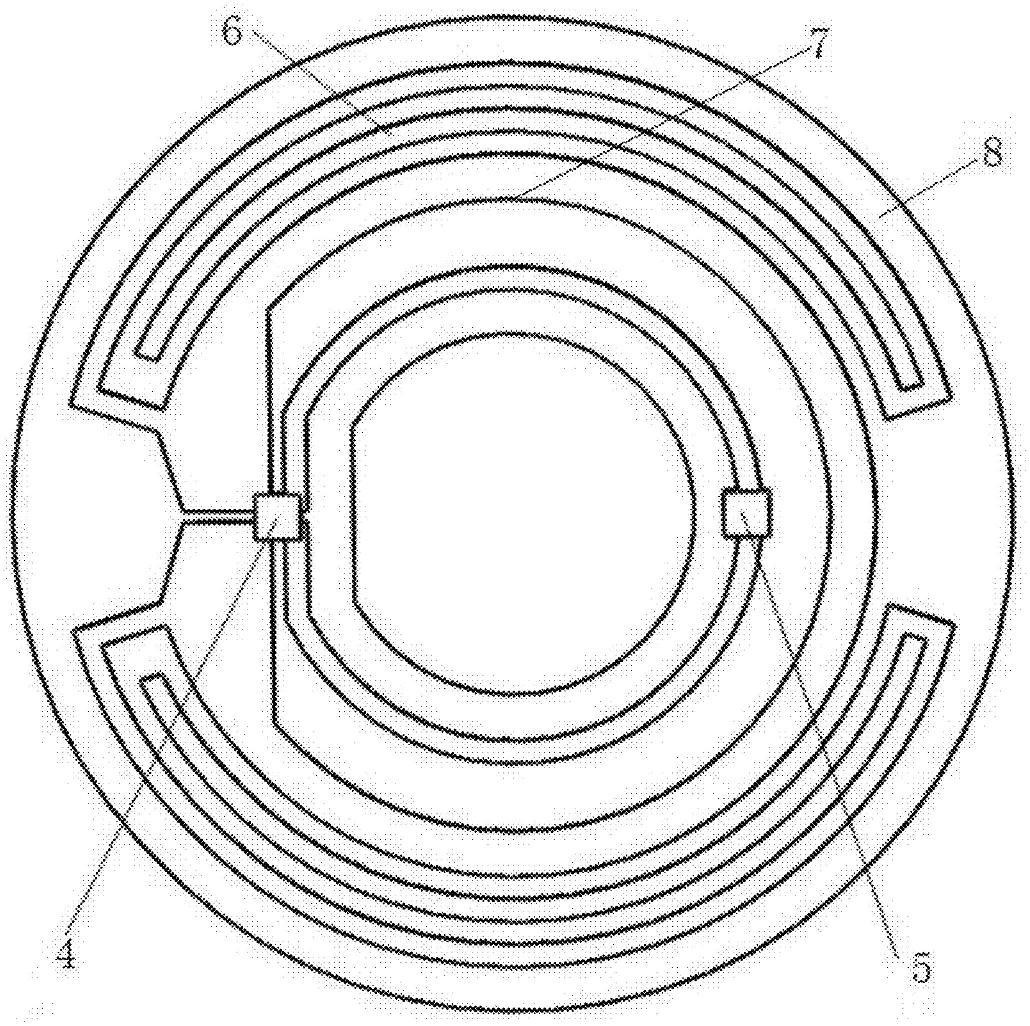
FIG. 3 is a partial structural schematic view of the animal body-temperature capturing apparatus provided by embodiments of the present disclosure.

As shown in FIGS. 1 to 3, in the first aspect, embodiments of the present disclosure provide an animal body-temperature capturing apparatus, including a male buckle 1 and a female buckle 2 detachably connected to each other. The male buckle 1 can penetrate through organs of animals, and the female buckle 2 can be connected to the male buckle 1. A body-temperature conductive portion 3 is provided on a side of the male buckle 1 facing the female buckle 2. A sensing module 5 configured to sense a temperature of the body-temperature conductive portion is further provided in the male buckle 1. When the male buckle 1 and the female buckle 2 clamp an organ of an animal, the male buckle 1 and the female buckle 2 are respectively fitted to the organ of the animal, and the body-temperature conductive portion 3 can sense a temperature of the organ of the animal and transmit the temperature to the sensing module 5. The male buckle 1 is further provided therein with a processing module 4, where the processing module 4 is electrically connected to the sensing module 5, can acquire a temperature signal of the sensing module 5, and transmit identity information and temperature signal of corresponding animal to the terminal device, thus realizing detection of a body temperature of the animal, and when an abnormal body temperature is detected in an animal, specific animal information can be viewed through the terminal device, thus accurately identifying the animal with abnormal body temperature, and realizing a function of monitoring the body temperature of the animal by the animal body-temperature capturing apparatus.

Optionally, the organs of the animals may include ears or wings, that is, the animal body-temperature capturing apparatus in the embodiments of the present disclosure can clamp ears or wings of animals.

Optionally, the processing module 4 and the sensing module 5 can be connected by a wire, thus enabling the signal transmitted to be more stable.

Optionally, the processing module 4 acquiring the temperature signal of the sensing module 5 includes the sensing module 5 actively transmitting the temperature signal to the processing module 4, or the processing module 4 actively acquiring the temperature signal of the sensing module 5.

Optionally, before the animal body-temperature capturing apparatus is worn, each processing module 4 will be embedded with identity information of a corresponding animal, and the identity information of each animal is different, and may include an identity photo or an identity ID, etc.

Optionally, the terminal device may further include a computer, a mobile phone, or an identity-temperature receiver, etc.

Optionally, the animal body-temperature capturing apparatus can be provided therein with a battery, and a power supply is provided by the battery. Moreover, the battery may be a rechargeable battery; or a solar panel, which can realize automatic charging, and enables the animal to wear the animal body-temperature capturing apparatus all the time, thereby avoiding an issue of dismounting and re-charging the animal body-temperature capturing apparatus when it is out of power.

Optionally, the animal body-temperature capturing apparatus may also be passive, that is, it is not provided therein with a battery, instead, a contactless charging mode can be implemented in a specific region when the animal moves to the specific region, which can also avoid the issue of dismounting and re-charging the animal body-temperature capturing apparatus when it is out of power.

As shown in FIG. 2, optionally, the body-temperature conductive portion 3 may be a thermo-sensitive protrusion or a thermo-sensitive ring sheet. Configuring the thermo-sensitive ring sheet can increase a contact area between the animal body-temperature capturing apparatus and the organ of the animal, thus enabling the sensed body temperature of the animal to be more accurate.

Optionally, the body-temperature conductive portion 3 can be connected to the sensing module 5 through a connection line, and can also transfer the temperature through other stable media.

As shown in FIG. 3, as an embodiment, the male buckle 1 is further provided therein with a receiving coil 6, where the receiving coil 6 is electrically connected to the sensing module 5 and the processing module 4, the receiving coil 6 can generate induced current and provide a power supply for the sensing module 5 and the processing module 4, so that the animal body-temperature capturing apparatus in the embodiments of the present disclosure is a passive device that can achieve an objective of automatic charging, and avoid a situation that the animal body-temperature capturing apparatus is out of power.

Optionally, within a range of animal breeding, a terminal device can be provided in a certain specific region. The terminal device includes a receiving module capable of receiving the temperature signal and the identity information transmitted by the animal body-temperature capturing apparatus for reference by staff. In addition, the terminal device can further include a charging coil, where when current passes through the charging coil, a magnetic field is generated, enabling the charging coil to become a magnet, and when the animal approaches, the receiving coil 6 in the animal body-temperature capturing apparatus will generate induced current, and alternating current with certain frequency can be provided for the charging coil, enabling the charging coil to generate a constantly varying magnetic field, in this way, when the receiving coil 6 approaches the magnetic field, current is generated in the receiving coil 6, thereby realizing transmission of energy. In addition, the receiving coil 6 also generates the alternating current, and in order to enable the receiving coil 6 to charge functional modules such as the processing module 4 and the sensing module 5, means such as a rectifier and a current stabilizer can be provided in the animal body-temperature capturing apparatus, thus enabling the current output by the receiving coil 6 to be direct current.

Moreover, supplying power for the functional modules such as the processing module 4 and the sensing module 5 in a passive manner can also reduce costs.

As shown in FIG. 3, as an embodiment, the male buckle 1 is further provided therein with an antenna 7, and the antenna 7 is connected to the processing module 4 for receiving or sending signals, so that information interconnection between the animal body-temperature capturing apparatus and a mobile terminal can be implemented.

Optionally, the antenna 7 is fabricated using a printing process or an etching process.

As shown in FIG. 3, as an embodiment, the male buckle 1 is provided therein with a support portion 8, and the receiving coil 6, the processing module 4 and the sensing module 5 are all fixed on the support portion 8.

Optionally, the support portion 8 is in a shape matching that of the male buckle 1, thus facilitating assembly in a base portion 112.

Preferably, the support portion 8 may be made of a PVC (polyvinyl chloride) material. Certainly, the support portion 8 can also be made of other plastic materials or organic polymer materials or paper materials other than the PVC material.

Optionally, the antenna 7 can be printed on a surface of the support portion 8, and the processing module 4, the sensing module 5, and the receiving coil 6 can be fixed on the surface of the support portion 8 by gluing.

Figure 4:
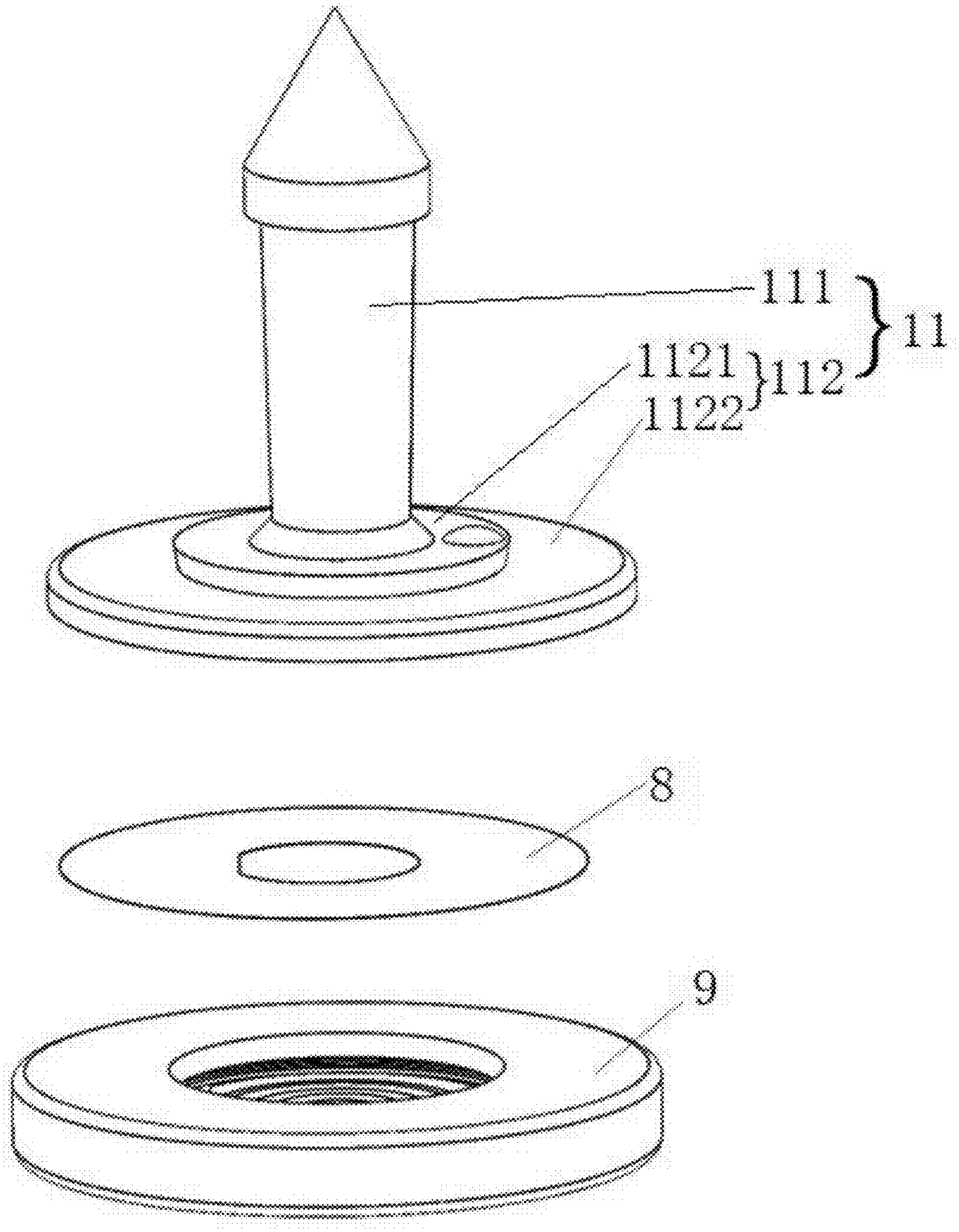
FIG. 4 is an exploded structural schematic view of a male buckle provided by embodiments of the present disclosure.

As shown in FIG. 4, as an embodiment, the male buckle 1 includes a piercing main body 11, where the piercing main body 11 includes a piercing portion 111, and the female buckle 2 can be sleeved on an outer surface of the piercing portion 111. By providing the piercing main body 11, it is convenient for the male buckle 1 to penetrate through the organ of the animal, and the female buckle 2 can be sleeved on the outer surface of the piercing portion 111, thereby realizing connection between the male buckle 1 and the female buckle 2.

As shown in FIG. 2 and FIG. 4, as an embodiment, the piercing portion 111 includes a piercing rod 1111; and the piercing main body 11 further includes the base portion 112, where the base portion 112 is connected to the piercing rod 1111, and a radial dimension of the piercing rod 1111 gradually increases from a connection position with the base portion 112 in a direction extending away from the base portion 112, in this way, when the female buckle 2 is sleeved on the outer surface of the piercing rod 1111, an interference fit is realized between the piercing rod 1111 and the female buckle 2, that is, when the female buckle 2 moves in the direction extending away from the base portion 112, as the piercing rod 1111 becomes gradually thicker, it is difficult for the female buckle 2 to move, thereby improving stability between the male buckle 1 and the female buckle 2. In addition, gradually increasing the radial dimension of the piercing bar 1111 from the connection position with the base portion 112 in the direction extending away from the base portion 112 also conforms to a growth rule of organs of animals; with the gradual growth of animals, the organs, such as ears or wings of the animals, also gradually become thicker, and during the thickening, the female buckle 2 also gradually moves in the direction extending away from the base portion 112, and the piercing rod 1111 also gradually becomes thicker in the direction extending away from the base portion 112, thus it is difficult for the female buckle 2 to move, thereby also improving the stability between the male buckle 1 and the female buckle 2.

As shown in FIG. 4, as an embodiment, the piercing portion 111 further includes a piercing tip 1112 for limiting the position of the female buckle 2, where the piercing tip 1112 is connected to the piercing rod 1111, and an end of the piercing tip 1112 connected to the piercing rod 1111 has a radial diameter greater than that of the piercing rod 1111, thus enabling the piercing tip 1112 to limit the position of the female buckle 2.

As shown in FIGS. 2 and 4, as an embodiment, the male buckle 1 further includes a protective sleeve 9, where the protective sleeve 9 is sleeved on the outer surface of the base portion 112, and the support portion 8 is located in the protective sleeve 9. By providing the protective sleeve 9, the base portion 112 can be protected.

Optionally, the protective sleeve 9 can be made of a silicone material, so as to improve adhesion to the organ of the animal.

Optionally, an outer surface of the female buckle 2 can also be provided with the protective sleeve 9.

As shown in FIG. 4, as an embodiment, the base portion 112 includes a first base layer 1121 and a second base layer 1122, where a radial dimension of the second base layer 1122 is greater than that of the first base layer 1121, and the body-temperature conductive portion 3 is provided on the first base layer 1121. The protective sleeve 9 is provided with a through-hole, and the first base layer 1121 is adapted to the through-hole, so that the body-temperature conductive portion 3 is exposed outside the protective sleeve 9, thus facilitating contact with the organ of the animal. Moreover, a radial dimension of the second base layer 1122 is greater than that of the first base layer 1121, so that a snap-fit structure is formed between the protective sleeve 9 and the base portion 112, and the second base layer 1122 supports the protective sleeve 9, thus improving stability of the structure.

Optionally, the support portion 8 can be installed in the second base layer 1122. On the one hand, the second base layer 1122 provides protection for the support portion 8, and on the other hand, it facilitates connection of the sensing module 5 on the support portion 8 with the body-temperature conductive portion 3.

Optionally, the protective sleeve 9 can consist of two parts, and covers the outer surface of the base portion 112 in a threaded connection manner.

Figure 5:
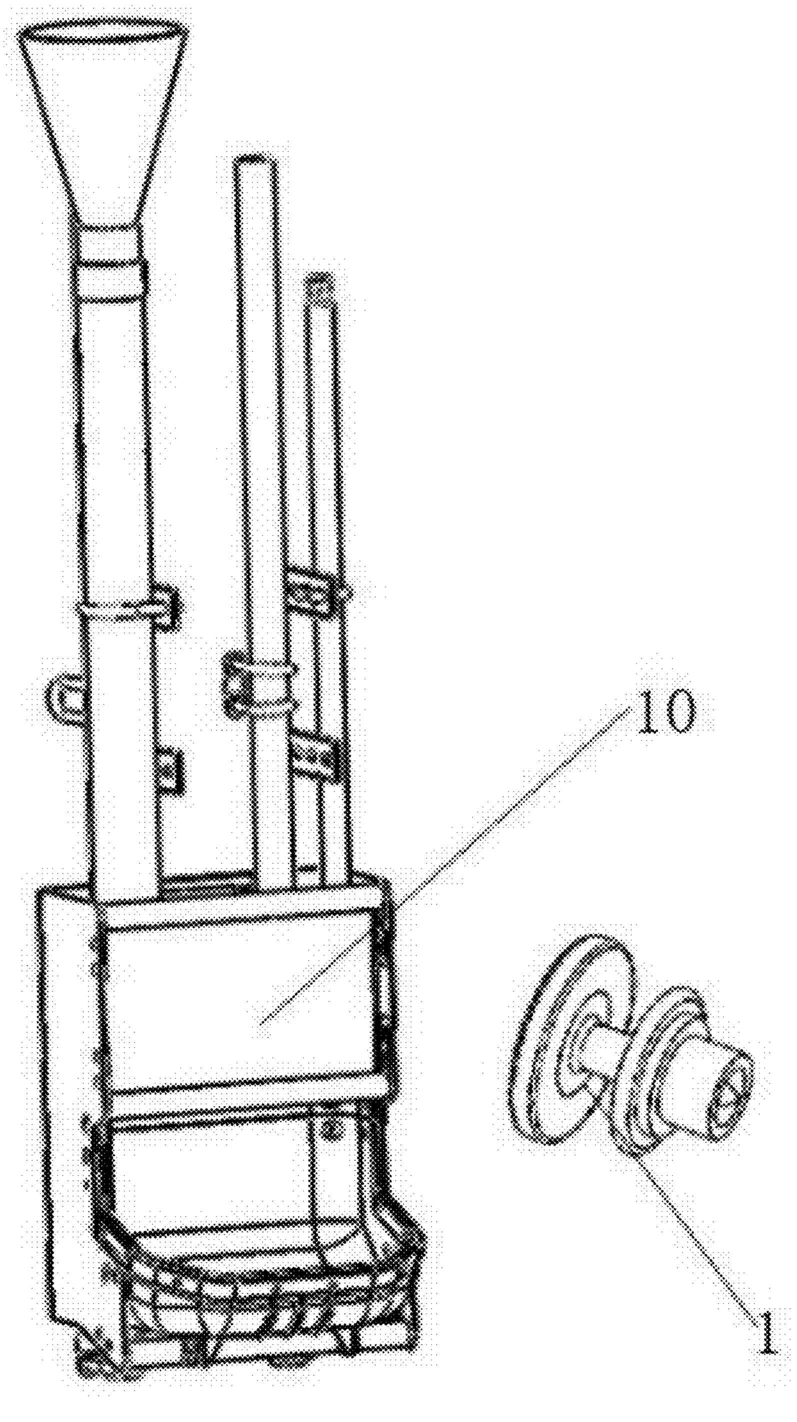
FIG. 5 is a structural schematic view of an animal information collecting system provided by embodiments of the present disclosure.

As shown in FIG. 5, in the second aspect, embodiments of the present disclosure provide an animal information collecting system, including the animal body-temperature capturing apparatus provided in the first aspect, and further including a feeding apparatus 10, where the feeding apparatus 10 can supply feed and drinking water to animals, and the feeding apparatus 10 is provided therein with a terminal device, where the terminal device can generate a varying magnetic field, and attracted by the feeding apparatus 10, animals can eat and drink water, thereby reducing a distance between the terminal device and the animal body-temperature capturing apparatus, and as the terminal device can generate the varying magnetic field, the receiving coil 6 in the animal body-temperature capturing apparatus can generate the induced current, so that the processing module 4 and the sensing module 5 can be charged.

In addition, the terminal device includes a charging coil, and when current passes through the charging coil, the feeding apparatus 10 can be externally connected to alternating current to provide alternating current with certain frequency for the charging coil, thus enabling the charging coil to generate a constantly varying magnetic field, in this way, when the animal approaches the feeding apparatus 10 to eat or drink water, current is generated in the receiving coil 6, thereby realizing transmission of energy.

Optionally, the terminal device provided in the feeding apparatus 10 in the embodiments of the present disclosure also reduces human intervention, that is, there is no need to artificially drive the animal to a certain specific environment to charge the animal body-temperature capturing apparatus, while the animal body-temperature capturing apparatus can be charged through living needs of the animal, thereby reducing labor costs. In addition, through an eating or drinking process, a sick animal can also be identified, because the animal's eating or drinking is the most fundamental survival instinct, and the animal whose identity information and temperature signal are not acquired may be in a diseased situation.

Optionally, the terminal device can further include a computer, a mobile phone, or an identity-temperature receiver, etc., so that the identity information of animals can be received, and the animals are observed through a display on the computer or the mobile phone.

The above-mentioned are only for embodiments of the present disclosure, and are not intended to limit the scope of protection of the present disclosure. Various modifications and changes could be made to the present disclosure by those skilled in the art. Any modifications, equivalent substitutions, improvements and so on made within the spirit and principle of the present disclosure should be covered within the scope of protection of the present disclosure. It should be noted that like reference signs and letters represent like items in the following drawings, and thus, once a certain item is defined in one drawing, it is unnecessary to further define and explain the same in subsequent drawings.

The above-mentioned are merely for specific embodiments of the present disclosure, but the scope of protection of the present disclosure is not limited thereto, and any variation or substitution that would be readily conceivable to those skilled in the art within the technical scope disclosed in the present disclosure should fall within the scope of protection of the present disclosure. Therefore, the scope of protection of the present disclosure should be based on the scope of protection of the claims.

It should be indicated that in the present text, relational terms such as first and second are merely used for distinguishing one entity or operation from another entity or operation, while it is not required or implied that these entities or operations necessarily have any such practical relation or order. Moreover, the terms such as "comprise", "contain" or any other variants thereof are intended to encompass non-exclusive inclusion, such that a process, a method, an article or a device including a series of elements includes not only those elements, but also includes other elements that are not explicitly listed, or further includes elements inherent in such a process, method, article, or device. Without further limitations, an element specified by the phrase "comprising a . . . " does not exclude the presence of additional identical elements in the process, method, article or device that includes the specified element.

What is claimed is:

1. An animal body-temperature capturing apparatus, comprising:

a male buckle and a female buckle detachably connected to each other, wherein the male buckle is capable of penetrating through an organ of an animal, and the female buckle and the male buckle are fitted for clamping the organ of the animal; a body-temperature conductive portion is provided on a side of the male buckle facing the female buckle, the male buckle is provided therein with a sensing module configured to sense a temperature of the body-temperature conductive portion; and the male buckle is further provided therein with a processing module, wherein the processing module is electrically connected to the sensing module, and the processing module is configured to acquire a temperature signal of the sensing module, and transmit identity information and the temperature signal to a terminal device, wherein the male buckle comprises a piercing main body, wherein the piercing main body comprises a piercing portion, and the female buckle is capable of being sleeved on an outer surface of the piercing portion;

wherein the piercing portion comprises a piercing rod; and the piercing main body further comprises a base portion, wherein the base portion is connected to the piercing rod, and a radial dimension of the piercing rod gradually increases from a connection position with the base portion in a direction extending away from the base portion.

2. The animal body-temperature capturing apparatus according to claim 1, wherein the male buckle is further provided therein with a receiving coil, wherein the receiving coil is electrically connected to the sensing module and the processing module, and the receiving coil is capable of generating induced current, and provides a power supply for the sensing module and the processing module.

3. The animal body-temperature capturing apparatus according to claim 2, wherein the male buckle is further provided therein with an antenna, and the antenna is connected to the processing module for receiving or sending signals.

4. The animal body-temperature capturing apparatus according to claim 3, wherein the male buckle is provided therein with a support portion, and the receiving coil, the processing module and the sensing module are all fixed on the support portion.

5. The animal body-temperature capturing apparatus according to claim 1, wherein the piercing portion further comprises a piercing tip for limiting the position of the female buckle, wherein the piercing tip is connected to the piercing rod, and an end of the piercing tip connected to the piercing rod has a radial diameter greater than that of the piercing rod.

6. The animal body-temperature capturing apparatus according to claim 5, wherein the male buckle further comprises a protective sleeve, wherein the protective sleeve is sleeved on an outer surface of the base portion, and a support portion is located in the protective sleeve.

7. The animal body-temperature capturing apparatus according to claim 6, wherein the base portion comprises a first base layer and a second base layer, wherein a radial dimension of the second base layer is greater than that of the first base layer, and the body-temperature conductive portion is provided on the first base layer; and the protective sleeve is provided with a through-hole, and the first base layer is adapted to the through-hole.

8. An animal information collecting system, comprising the animal body-temperature capturing apparatus according to claim 1, and further comprising a feeding apparatus, wherein the feeding apparatus is provided with the terminal device, wherein the terminal device is capable of generating a varying magnetic field for enabling the male buckle to generate induced current.

9. The animal information collecting system according to claim 8, wherein the male buckle is further provided therein with a receiving coil, wherein the receiving coil is electrically connected to the sensing module and the processing module, and the receiving coil is capable of generating induced current, and provides a power supply for the sensing module and the processing module.

10. The animal information collecting system according to claim 9, wherein the male buckle is further provided therein with an antenna, and the antenna is connected to the processing module for receiving or sending signals.

11. The animal information collecting system according to claim 10, wherein the male buckle is provided therein with a support portion, and the receiving coil, the processing module and the sensing module are all fixed on the support portion.

12. The animal information collecting system according to claim 8, wherein the male buckle comprises a piercing main body, wherein the piercing main body comprises a piercing portion, and the female buckle is capable of being sleeved on an outer surface of the piercing portion.

13. The animal information collecting system according to claim 9, wherein the male buckle comprises a piercing main body, wherein the piercing main body comprises a piercing portion, and the female buckle is capable of being sleeved on an outer surface of the piercing portion.

14. The animal information collecting system according to claim 13, wherein the male buckle is further provided therein with an antenna, and the antenna is connected to the processing module for receiving or sending signals.

15. The animal information collecting system according to claim 14, wherein the male buckle is provided therein with a support portion, and the receiving coil, the processing module and the sensing module are all fixed on the support portion.

* * * * *